July 12, 1932. L. E. CLEMENT 1,866,965
PROCESS FOR THE SEPARATION OF CELLULOSIC MATERIALS
Filed June 29, 1929
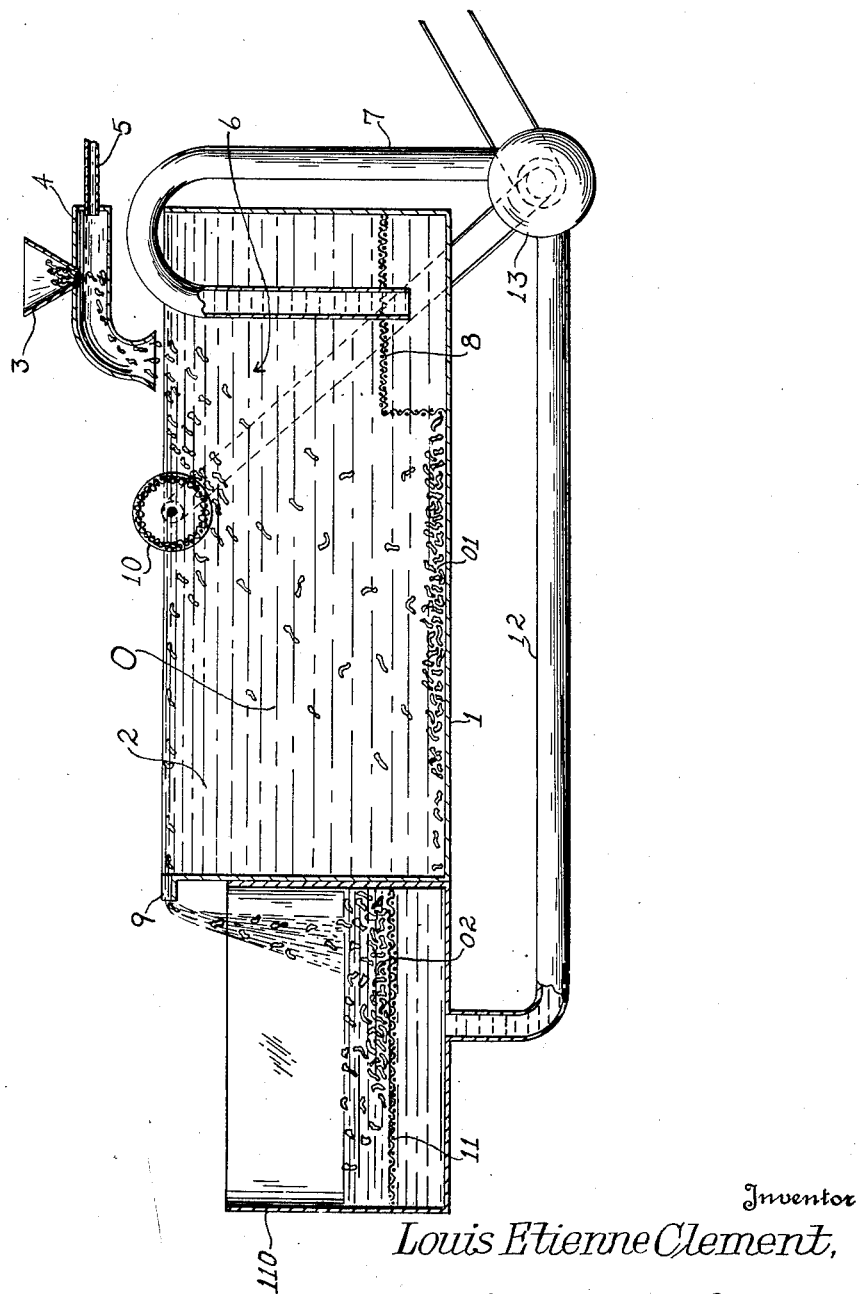
Inventor
Louis Etienne Clement,
By Newton M. Perrins
Attorney Patented July 12, 1932　　BEST AVAILABLE COPY　　1,866,965

UNITED STATES PATENT OFFICE

LOUIS ETIENNE CLEMENT, OF MEUDON, FRANCE, ASSIGNOR TO EASTMAN KODAK COMPANY, OF ROCHESTER, NEW YORK, A CORPORATION OF NEW YORK

PROCESS FOR THE SEPARATION OF CELLULOSIC MATERIALS

Application filed June 29, 1929. Serial No. 374,819.

This invention relates to a process for the separation of gelatinized cellulosic materials and particularly to the separation of cellulose acetate and cellulose nitrate film scrap.

Photographic film supports which are used for various purposes in the photographic and allied arts are composed for the most part of cellulose nitrate and cellulose acetate. Necessarily there is a great deal of this material accumulated by the manufacturer from various sources as, for example, from cuttings in manufacture and worn out motion picture film. Much of this material is of such a character that it cannot be manually separated without considerable labor and expense.

It has been customary in separating these scrap materials containing both cellulose acetate and cellulose nitrate to dissolve up the scrap in a solvent of one or the other of the materials. By so doing the cellulose derivative not dissolved may be filtered from the derivative which has been dissolved. This operation is expensive and the undissolved cellulose derivative is generally lost in the process.

It is the object of the present invention to provide a method and apparatus for effectively and economically separating gelatinized cellulose materials having dissimilar specific gravities, and particularly a method for the separation of cellulose acetate and cellulose nitrate film scrap.

I have found that mixtures of gelatinated cellulosic derivatives may be separated by immersing the derivatives in a non-solvent liquid having a specific gravity between that of the materials when immersed in the solution. While I have found that this process is particularly applicable to the separation of cellulosic film scrap, whether it be composed of cellulose acetate, cellulose nitrate, cellulose ether, etc., the process is, however, useful for the separation of any cellulosic materials such, for example, as the various rayons, when two or more of them are found together and which have a sufficient difference in specific gravity to accomplish their separation.

A certain degree of difference in the specific gravity for efficient separation is, of course, essential. The greater the variation in the specific gravity the more rapid and complete will be the separation. I have found that the difference between the specific gravity of cellulose nitrate and of cellulose acetate is sufficient for very thorough separation. The nitrocellulose generally has a specific gravity of 1.45 while cellulose acetate has a specific gravity in the neighborhood of 1.24. If these two cellulosic materials be immersed in a liquid having a specific gravity of 1.35 the cellulose acetate will rise to the top of the liquid and cellulose nitrate will settle to the bottom, thus effecting a ready separation of the two.

In the separation of more than two materials the material having the specific gravity most different from the others is generally separated first, while the remaining materials may be separated by subsequent immersions in the bath or if desired by dissolving out the materials it is desired to recover.

The liquid suspending medium may consist of any liquid having a specific gravity between that of the materials to be separated, providing it has no appreciable dissolving action upon the cellulose materials. In the separation of cellulose acetate and cellulose nitrate, for instance, I have found that an aqueous solution of sodium nitrate or calcium chloride is very effective, it merely being necessary to dissolve these salts or any suitable inorganic salt in water to give the desirable specific gravity to the liquid. It is obvious that organic liquids having the desired solubility might be used or mixtures of them, but their use would give no advantages over the use of aqueous salt solutions and would have the disadvantage of being considerably more expensive.

In separating cellulosic materials having slight differences in specific gravity it is essential that the liquid medium be held within certain temperature limits in order that its specific gravity be kept at its optimum value.

Regardless of whether there is a wide or only a narrow difference in specific gravity of the materials being separated, the optimum value or most efficient specific gravity of the liquid is one which is approximately the average of or midway between the materials which are to be separated. For instance, as set forth above, approximately 1.35 is the most efficient gravity for the liquid used in separating cellulose acetate and cellulose nitrate. Temperature variations will not materially affect the efficiency of this solution, although, should the specific gravities of the materials being separated be, say, 1.24 and 1.30 respectively, then the liquid should be rather carefully maintained at a specific gravity of 1.27 for greatest efficiency. To carefully control the specific gravity of the solution it might be necessary to control the temperature of the solution, which of course is well known to those skilled in this art.

The accompanying figure is a sectional view of an apparatus that may be used for this purpose. It will, of course, be understood that this apparatus is merely descriptive of the type of apparatus which may be used for this method of separation.

The tank 1 is filled with a suitable liquid 2 such, for example, as a solution of calcium chloride having a specific gravity of 1.35, if cellulose nitrate and cellulose acetate scrap is to be separated. The scrap film which it is generally advisable to shred into small bits prior to separation is fed into the hopper 3, the film drops from the hopper into the air chamber 4 in which there is set up a turbulent blast of air injected through pipe 5. The film, as it comes into this air chamber, is violently agitated and thereby the individual shreds of the cellulosic material are separated, one from the other. The film proceeds along chamber 4 and is brought into contact with the liquid which is agitated at approximately the point 6. This agitation is caused by a liquid feed pipe 7 which forces the liquid to the bottom of the tank 1 and up through the screen member 8.

This agitation together with the original air agitation keeps the separate constituents of the scrap free from one another. There is a gradual flow of the liquid from point 6 to the overflow 9 whereby the scrap passes beyond the agitated section of the tank and separates, in the unagitated section 0, into its constituents, those lighter than the liquid rising and those heavier than the liquid settling out. Any material riding on the top of the liquid after being fed to the surface from pipe 4 is forced under the liquid by means of the rotating screen 10. The heavier portions of the material settle to the bottom of the tank 1 at 01 and the lighter portions travelling along the surface are removed from the tank with the overflow at 9 into a container 110. The liquid in this container is sent back through the screen 11, pipe 12, pump 13 and pipe 7 to the separating tank. In the operation of this apparatus or any similar apparatus it is essential that no air be trapped in the liquid. Otherwise this air will attach itself to the material undergoing separation and both the heavy and the light material will float. The heavy material may, at suitable intervals, be removed from the bottom of the tank 1, either by removing all the liquid from said tank or by having a continuous conveyor, not shown, therein and, without disturbing the liquid, removing the material continuously therefrom without the necessity of pumping out the liquid. The lighter material 02 may be removed from the container 110 from time to time. The screen 11 is used both to prevent the lighter material from being drawn back into the cycle as well as to prevent any eddying whereby air is drawn into the system. The material after removal may be thoroughly washed and is then in condition for re-use. In the separation of cellulose acetate and cellulose nitrate scrap the cellulose acetate is recovered from container 110 and the cellulose nitrate from the bottom of the tank 1.

The separation need not be continuous but may be carried out by violently agitating the material to be separated in a tank containing a liquid of the desired gravity and then allowing the material to separate by gravity. Such an apparatus, while suitable for small batches of material, is not economical if a large amount of material is to be separated.

Various changes may be made in the constituents added to the liquid to give the desired specific gravity for carrying out this separation and in the design of the apparatus used therefore, without in any way departing from this invention or sacrificing any of the advantages derived from its use.

Having thus described my invention, what I claim as new and desire to secure by Letters Patent is:

1. A process of separating two colloidized cellulose derivatives, whose specific gravities differ by less than approximately .3 which comprises forcibly separating the derivatives into individual particles, immersing these particles in a substantially non-solvent liquid which has a specific gravity between that of the derivatives being separated and floating off the cellulose derivative of lesser specific gravity.

2. A process of separating colloidized cellulose nitrate scrap from colloidized cellulose acetate scrap, the nitrate scrap and the acetate scrap having specific gravities which differ by less than approximately .3, which comprises forcibly separating a heterogeneous mixture of the acetate scrap and the nitrate scrap into individual particles, immersing these particles in a substantially non-solvent liquid which has a specific gravity between that of the acetate scrap and the nitrate scrap, and floating off the cellulose acetate scrap particles.

Signed at Paris, France, this 7th day of June, 1929.

LOUIS ETIENNE CLEMENT.